US008176031B1

(12) United States Patent
Rubin

(10) Patent No.: US 8,176,031 B1
(45) Date of Patent: May 8, 2012

(54) SYSTEM AND METHOD FOR MANIPULATING DATABASE SEARCH RESULTS

(75) Inventor: Stuart H. Rubin, San Diego, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 309 days.

(21) Appl. No.: 12/552,506

(22) Filed: Sep. 2, 2009

(51) Int. Cl.
*G06F 17/00* (2006.01)
(52) U.S. Cl. ........................................ 707/706
(58) Field of Classification Search .......... 707/706, 707/999.005, 999.003, 999.1
See application file for complete search history.

(56) References Cited

U.S. PATENT DOCUMENTS 7,047,226 B2  5/2006 Rubin
2011/0055192 A1 * 3/2011 Tang et al. ................. 707/706

OTHER PUBLICATIONS

Rubin, Stuart H. et al., KASER: Knowledge Amplification by Structured Expert Randomization, Dec. 2004, Cybernetics, vol. 34, No. 6, pp. 1-13, United States.

Rubin, Stuart H., On Randomization and Discovery, Jun. 6, 2006, Information Sciences, vol. 177 (2007), pp. 170-191, United States.
Rubin, Stuart H. et al., Directing Web Search Engines using a Knowledge Amplification by Structured Expert Randomization Architecture, 2009 Sensors Networks and Applications Conference (submitted for publication at the conference).

* cited by examiner

*Primary Examiner* — Rehana Perveen
*Assistant Examiner* — Mohsen Almani
(74) *Attorney, Agent, or Firm* — Arthur K Samora; Kyle Eppele

(57) ABSTRACT

Systems and methods for extracting information from large databases include the initial step of searching a database using a query. The search results are then normalized by formatting the search results in a standard text format. The normalized search results are then crawled according to a predetermined algorithm to yield candidate information, which includes establishing sequences of keywords and generating hash tables that correspond to the keyword sequences. For each paragraph of candidate information, a defined possibility for each hash table entry is calculated. If the possibility is above a predetermined value, the candidate information paragraph is extracted from candidate information and presented to the user. Only the paragraphs that have a possibility that is above the predetermined threshold are displayed and presented to the user. Displayed search results rated as useful by the user are added to the query and to the keyword sequences to accomplish iterative, context-directed searches.

9 Claims, 4 Drawing Sheets

User settings

| Active engine | Yahoo BOSS (build your own search service) ▽ |

Select between the Yahoo search service and Google search service. Beware that not all features are available on both services. Note: the Google SOAP API is deprecated and will officially cease operations Aug. 31, 2009; the Google AJAX API should replace it. Until further notice, the Yahoo search service is the best engine to use.

| Websites per page | 10 |

Select how man websites to display per page, the default is 10. Large values will slow down searches; very large values will be rejected by some search engines. Squelch values above 0 will effect reduce the effectiveness of this setting.

| Squelch | 0 |

Set the lowest positive paragraph possibility to show.

| Show method | Pedagogical ▽ |

Select which method to list paragraphs in the search result page. Pedagogical will take the mean of all paragraphs on a webpage and rank that in the results; only 1 entry per webpage will be presented. Decision support will display all paragraphs on a webpage on the search page; there can be multiple entries per webpage. Note that the "Websites per page" user setting for the decision support method will possibly generate more than the specified entries. Also note that pedagogical view will be skewed by empty paragraphs during ranking.

| User rating | ○ Yes ○ No |

Set whether you would like to rank the website paragraphs on your own

| Paragraph display | Strict (show only paragraph text) ▽ |

Select whether to display only text or also other tags inside each result paragraph. Strict will show only text and strip out any formatting tags, It may also strip out important information. Markup will show all HTML tags within a paragraph, including anchors and Images but without any formatting [CSS] applied. The results depend on the websites, but usually strict is good enough.

After saving your settings, you will be taken to the search page.

[Save settings] [Use default settings]

*FIG. 6*

SYSTEM AND METHOD FOR MANIPULATING DATABASE SEARCH RESULTS

FEDERALLY-SPONSORED RESEARCH AND DEVELOPMENT

This invention (Navy Case No. 099432) is assigned to the United States Government and is available for licensing for commercial purposes. Licensing and technical inquires may be directed to the Office of Research and Technical Applications, Space and Naval Warfare Systems Center, Pacific, Code 72120, San Diego, Calif. 92152; voice (619) 553-2778; email T2@spawar.navy.mil.

FIELD OF THE INVENTION

The present invention pertains generally to systems and methods for searching large volumes of free text. More specifically, the present invention pertains to systems and methods for searching large volumes of free text to extract relevant information from the text, evaluate the relevance of the text and present the relevant text to the user.

BACKGROUND OF THE INVENTION

There is a massive amount of information available on the internet, which can be extremely useful to the user in the search for relevant knowledge that pertains to an area of interest. The key to using this information, however, is to find an efficient way to sort through the massive amounts of information to find what is relevant. Search engines do not really search the world wide web directly. Instead, search engines typically search a database of the full text of web pages automatically harvested from the billions of web pages that are available on the internet. Web browsers such as Google, Yahoo! and ask.com can be used to find a plethora of websites relevant to the user's query—sometimes over a million sites. However, these web browsers do little to extract the relevant information from these sites for presentation to the user.

Search engine databases are selected and built by computer robot programs that are often referred to as spiders. These spiders "crawl" the web, finding pages for potential inclusion by following the links in the pages that the spiders already have in their database (i.e., already "know about"). Spiders cannot use judgment; that is, they cannot "decide" to look something up and see what is on the web about it. If a web page is never linked to from any other page, search engine spiders cannot find it. The only way a brand new page (a web page that no other web page has previously linked to) can get into a search engine is for its Uniform Resource Locator (URL), or web address, to be sent to the search engine companies with a request that the new page be included.

After spiders find web pages, they pass the web page URL's on to another computer program for "indexing." The other computer program identifies the text, the links, and the other content in the page and stores it in the search engine database's files so that the database can be searched by keyword and whatever more advanced approaches are offered, and the page will be found if the search matches the web page content. Once the user hits upon the right keyword, the search engine finds the web page URL and presents the URL for review by the user. But, the user must still open the URL link and review the website for the relevant material. If the material is not readily apparent, the user must often search within the webpage to find the relevant material. This can be very inconvenient and time consuming.

In view of the above, it is an object of the present invention to provide systems and methods for manipulating search engine results that use a query that has been constrained by the user using natural language specifications. It is another object of the present invention to provide systems and methods for extracting relevant information from databases that display only the relevant information for review by the user. It is yet another object of the present invention to provide systems and methods for manipulating search engine results that rank and prioritize plain text snippets of search results for review by the user. Another object of the present invention is to provide systems and methods for manipulating search engine results that obviate the need to further search the list of web pages for relevant information. It is another object of the present invention to provide systems and methods of manipulating search engine results that extract relevant text from database search results and present the relevant text to the user without requiring the user to actually review the search results.

SUMMARY OF THE INVENTION

Systems and methods for extracting information from large databases such as the internet, according to several embodiments of the present invention, include the initial step of searching a database using a query. When the database is the internet, the search results are then normalized by formatting the search results, i.e., by changing the search results format from a hypertext markup language (.html) format to a standard text format.

Once the search results are normalized, the methods for extracting information according to several embodiments of the present invention include the step of crawling the normalized search results to yield candidate information. In some embodiments, this can be accomplished by establishing a sequence S+ of words that the user wants displayed, and by further establishing a sequence S− of words that the user does not want to be displayed from the search results. It is important that all terms in S+ and S− are mutually exclusive, i.e., that S+∩S− is an empty set.

Once sequences S+ and S− are established, the methods can further include the step of establishing hash tables H+ and H− that correspond to respective sequences S+ and S−. An Actual Frequency Count (AFC) for each entry in H+ and H− is then calculated, and a possibility defined by the formula $$= \sum_{H^+(seq)\in paragraph}^{|H^+|} (|paragraphs| - AFC) - \left(\frac{|H^+|}{|H^-|}\right) \sum_{H^-(seq)\in paragraph}^{|H^-|} (|paragraphs| - AFC)$$

is calculated. If the possibility is above a predetermined value, the candidate information paragraph is extracted from candidate information and presented to the user.

The predetermined value can be established according to the manner in which the system and methods are to be used. If the system and methods are in pedagogical mode, for each normalized search result, the normalized search result possibilities are divided by the total number of paragraphs in the search result to yield an average possibility for each webpage. The normalized webpages are then presented in order of decreasing average possibility. If the system and methods are in decision support mode, a possibility threshold is determined by the user, and the possibilities for each paragraph in the normalized search results is calculated as described above. Only the paragraphs from the webpages having a possibility that is above the predetermined threshold are displayed and presented to the user.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

Figure 1:
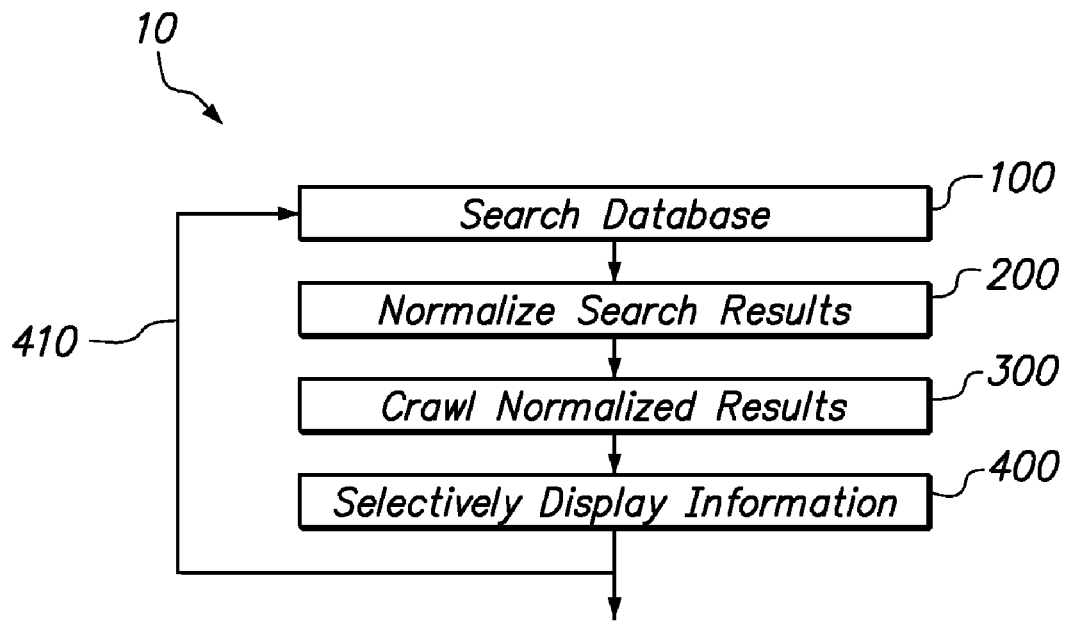
FIG. 1 is a block diagram that is illustrative of steps of the method of practicing the system of FIG. 1, according to several embodiments of the present invention.

Referring now to the Figures, and initially to FIG. 1, the method according to several embodiments of the present is shown and is generally designated by reference character 10. As shown, the method includes the initial step 100 of conducting a database search. To do this, the user supplies a query (For purposes of illustration throughout this specification, the query referred to is the query: "How can I protect the populace against a chlorine gas attack?"). The query can be supplied to an internet search engine (see query box 502 of screen shot 500 in FIG. 5) such as Google, Yahoo!, Ask.com, YouTube and/or FreePatentsOnline, by way of non-limiting example, to search for all of the most relevant instructional/decision support materials. It should be appreciated, however, that the query could be supplied to any accessible database, such as classified military databases, local intranets or even off-line document textual searches (e.g., diagnostic manuals).

In accomplishing step 100, all communications between the user and the web-search engine(s) can be performed by way of any user-defined avatar 504 (see FIG. 5) as known in the prior art (e.g., "Guardian from the City on the Edge of Forever in the original Star Trek series", "Librarian from the remake of the Time Machine", et al.). Speech synthesis can be incorporated for interacting with an avatar and/or for reading text (e.g., for the visually impaired) as set by a parameter on the user-settings page (not shown in FIG. 6). The system can work with both freeware speech synthesizers and avatars. Moreover, speech recognition software can allow queries (and their replies) to be ported to any number of handheld devices (e.g., cell phones). In addition to query spell checking, queries can be dynamically maintained in an auto-associative list, to allow for extrapolation of the user's prefix upon its recognition. This capability for auto-completion can also serve to improve the utility of a speech-recognition system front end.

The initial query can yield search results, which can be limited to a maximum amount, such as 100,000 pages found. Certain search results such as web pages may embed multimedia links or contain information in Adobe, Word, Excel, PowerPoint, and/or other less common formats. A checkbox on the user-settings page, the paragraph display box 602 in screen shot 600 shown in FIG. 6, can be used to determine which formats to pull the textual content off of or ignore (e.g., scan all .pdf files or ignore all .avi files, etc.). If too few or irrelevant pages (i.e., based on a defined threshold on the user-settings page) are returned, as gathered from the counter on the source page for the search engine(s), then the user may rephrase the query and/or modify the content of the query. In addition, if too many pages are returned by the query, then the user may scan only a predetermined maximum number of websites and/or extract a certain predetermined amount of filtered text by changing a setting, the websites per page box 604 on user-settings page 600, as show in FIG. 6 and defined more fully below.

The method according to several embodiments of the present invention is designed to return a sequence of paragraphs, which can be literally retrieved from the websites that are found in response to the initial query. To do this, the search results can be normalized by removing hypertext markup language (.html) format instructions so that each page can be converted into a uniform simple text format. This is indicated by step 200 in FIG. 1.

Figure 5:
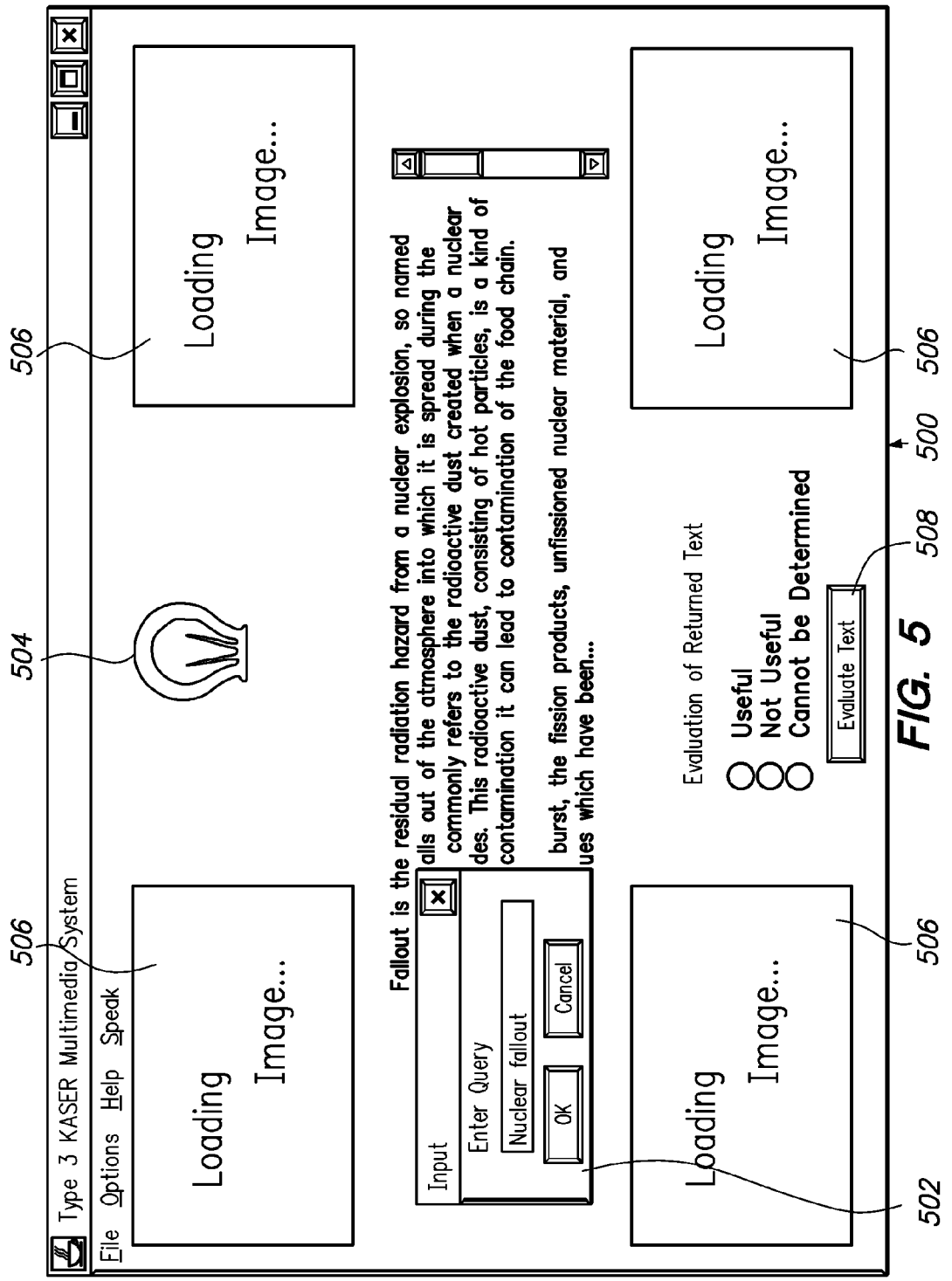
FIG. 5 is a screen shot which depicts the visual display to the user during the operation of the systems and methods of several embodiments of the present invention; and, FIG. 6 is a screen shoot of the user setting page of the system and methods according to several embodiments of the present invention.

For database search results that are internet search results, embedded links to the multimedia in the internet search results can be shown as thumbnails 506 at the four corners of results screen shot 500 (see FIG. 5). In addition, the user may define templates or schema, along with simple algorithms that select which schema to apply, and when. The user may also define when to use different displays, which may be accessed through the user-settings page. For example, images and videos may expand or play when clicked on and revert to thumbnail form when clicked on again. The enabled multimedia links should follow or derive from the contents of the textbox as it is scrolled. This textbox should allow for the inclusion of embedded web text and/or media links. Multimedia can otherwise be sorted for relevancy and presented in sequence; it can be gathered from all relevant web page paragraphs having the highest possibilities (the manner in which possibilities can be calculated is shown and described in greater detail below).

Figure 2:
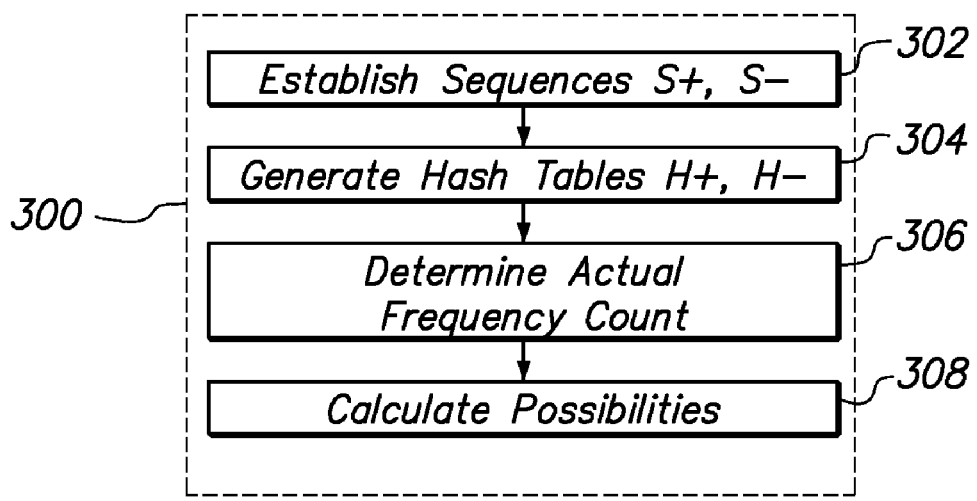
FIG. 2 is a block diagram that illustrates additional steps that can be performed in accomplishing the crawl search results step from the primary method shown in FIG. 1, according to several embodiments of the present invention.

Once the database search results are normalized as described above, the normalized results can be crawled to extract relevant information, as indicated by step 300 in FIGS. 1 and 2. One manner in which this can be accomplished is shown in greater detail in FIG. 2. In addition to an interactive query textbox by way of a user-defined avatar, there are two additional textboxes to establish sequences S+ and S− of terms that can be manipulated further. Sequence S+ allows the user to enter descriptive sentences pertaining to what they are looking for and may be arbitrarily long. Sequence S− allows the user to enter descriptive sentences pertaining to what the user does not want to retrieve. The use of these positive and negative sequences S+ and S−, respectively is optional and if left blank, the system will function much as does the underpinning web search engine(s). The establishment of sequences S+ and S− is indicated by box 302 in FIG. 2

For purposes of this disclosure, S can be used to denote both S+ and S− generically. It is required that the terms in S+ and S− be mutually exclusive; that is, S+∩S− must be the empty set. For example, the word "the" is removed from S because it can be common to both S+ and S−, so it cannot be used to discriminate positive search result content from negative search result content.

Once sequences S+ and S− are established, and as indicated by step 304 in FIG. 2, hash tables H+ and H− that correspond to respective sequences S+ and S− can be generated. To do this, a hash dictionary may be incorporated to normalize all words in S, as well as to normalize the crawled search results. For example, "crawled" can be replaced by "crawl" for prefix-based pattern-matching purposes (i.e., "crawl" then matches "crawled", "crawling", but not "crawler"). Similarly, "commonly" can be replaced by "common"; "statistics" can be replaced by "statistic", and so on. However, words such as "heater" may not be replaced by "heat" and "ruler" may not be replaced by "rule". The rules for grammatical randomization may thus be manually defined by a linguistics professional in several embodiments of the present invention. The user is never shown the web text after it has been normalized (i.e., the user never see the entries in hash tables H+ and H−); only the web pages as they were retrieved prior to any normalization are displayed. The normalized web text is only used by the systems and methods according to several embodiments of the present invention for pattern-matching purposes, as described below.

Both of sequences S and the search results can also be synonym normalized. For example, the set of synonyms {boat, vessel, craft} could act as normalized synonyms for the word "ship". Thus, two successive hashes are required using two distinct hash tables (i.e., the first for the normalization of words, if any, and the second for the reduction of synonyms, if any). One example website for synonyms and antonyms is MSN Encarta at http://encarta.msn.com/thesaurus, although other sources could easily be used for synonym normalization.

Since S+∩S− must be the empty set, if during this step a word or sequence of words for placement in one hash table H+ is found in the inverse hash table H−, the word or sequence of words is expunged from both hash tables H+ and H−. Also, the normalization of the terms in the hash tables H must be deterministic (i.e., at most one normalization is possible). The normalization must also be idempotent (i.e., the normalization of any left-hand side is that left-hand side). For example, the set {blow up, blast, explode, detonate, destroy, wreck)} can be used as synonyms for dynamite. However, to say that Alfred Nobel invented "dynamite" does not have the same semantics as to say that he invented "destroy". Further, antonyms cannot substitute for a negative textbox. For example, the noun "laser" has no antonym, so the user should literally specify that "boats" not be retrieved here in sequence S−; otherwise, a query that includes the word "laser" can also include candidate information on types of boats that are lasers.

The above-described normalized pattern-matching applies the fact that more text is statistically more likely to embody more synonyms than is less text. Moreover, the systems and methods according to several embodiments of the present invention allow the user to iteratively reduce the text returned (i.e., after user review) through the specification and extension of S. The manner in which the user iteratively write an ever-more comprehensive and focused sequences S+ and S−, which further results in more clearly defined hash tables H+ and H− and less, more focused candidate information, is described more clearly below.

As cited above, the methods of several embodiments include the step 304 of generating separate additional hash tables, H+ and H−, corresponding to S+ and S−, respectively, and populating them with all normalized words and phrases (not to extend across sentence boundaries) found in the normalized positive and negative textboxes. The text in each returned web page (up to the number of pages retrieved or produced as constrained by the user-settings page) is crawled using the terms in H+ and H−. Sentences or phrases are delimited by colons, semicolons, dashes, and periods though care must be taken that such "words" as 3.1415926 do not act as delimiters. Thus, if S+ included the phrase "I seek 007.", then hash table H+ would contain, {(I) (seek) (007) (I seek) (seek 007) (I seek 007)}, or n(n+1)/2 entries, which is O(cn$^2$), where n is the maximum number of words per sentence in S+ or S− and c is proportionate to the number of sentences in S.

For each entry in hash tables H+ and H−, an actual frequency count (AFC) is determined, as indicated by step 306 in FIG. 2. For each entry in H, the AFC reflects the number of distinct paragraphs that the normalized word, phrase, or statement from H (H is used to refer to both hash tables H+ and H−) occurs in the crawled search result. Two or more occurrences of terms from H in the same paragraph are only counted once. This is because subject declarations are qualitative, not quantitative. Also, the frequency count for all hash entries in H is set to zero if that hash entry sequence has an embedded subsequence having a frequency count of zero. This is because it is never necessary to crawl the normalized search results for hash table entry H+(seek 007) if hash table entry H+(seek) or H hash table entry H+(007) has previously been encountered zero times in the normalized search results. All sequences from H for which the frequency count is zero are eliminated. This methodology allows for the rapid elimination of sequences that have no chance of finding a match in the normalized web text.

Once the AFC for each term in H is determined, and as indicated by box 308 in FIG. 2, a numeric possibility is calculated for each paragraph, and the paragraphs are displayed (categorically by website) in non-increasing order of this relevancy statistic. The possibility for each paragraph is computed as follows. Each term in H is checked for occurrence in the current normalized and period-delimited (see above) paragraph, and the AFC for each term in H is associated with the current paragraph. Again, the same subsequence is not counted twice for the same paragraph—even should it occur more than once. Observe below that |paragraphs|≧AFC. Paragraphs containing a sequence that is found in relatively few other paragraphs receive more weight than otherwise. Also, paragraphs must be weighted in proportion to the number of distinct subsequences from H+ or alternatively H− that they embody. The greater the number of distinct subsequences contained, the better the match. Thus, possibility (paragraph)=0, if |H+| and |H−| are both zero (e.g., if S+ and S− are both left blank). The possibilities for each paragraph are calculated as follows:

$$\text{possibility} = \sum_{H^+(seq) \in paragraph}^{|H^+|} (|\text{paragraphs}| - AFC)$$

if $|H^-|$ is zero (e.g., if $S-$ is left blank);

$$\text{possibility} = -\sum_{H^-(seq) \in paragraph}^{|H^-|} (|\text{paragraphs}| - AFC)$$

if $|H^+|$ is zero (e.g., if $S+$ is left blank);

-continued $$= \sum_{H^+(seq) \in paragraph}^{|H^+|} (|\text{paragraphs}| - AFC) -$$

$$\frac{|H^+|}{|H^-|} \sum_{H^-(seq) \in paragraph}^{|H^-|} (|\text{paragraphs}| - AFC),$$

otherwise. The ratios in the above formulas normalize the calculations, where the positive and negative textboxes are of different lengths and/or organization.

Once the possibilities are calculated as described above, the methods according to some embodiments of the present invention include the step of selectively displaying the candidate information to the user, as depicted by block 400 in FIG. 1. In several embodiments of the systems and method of the present invention, the user has the ability to provide context-directed constraints on an iterative search, based on the user's review of the displayed search results. The manner in which this is accomplished is described more fully below.

Figure 3:
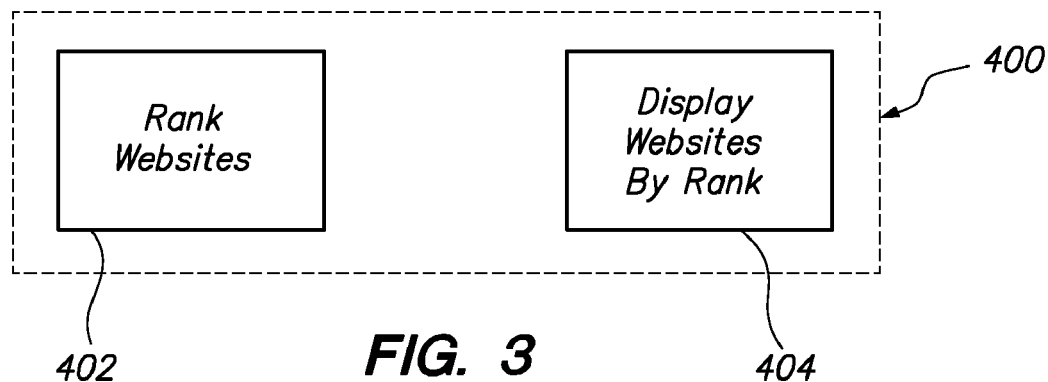
FIG. 3 is a block diagram that illustrates additional steps that can be performed after accomplishing the calculate possibilities step for the method shown in FIG. 1, according to several embodiments of the present invention.

The selective display step can have sub-steps, depending on which mode the system of the present invention is in. If the system of the present invention is in pedagogical mode (i.e., If the user-settings page specifies a pedagogical presentation), then the methods include the step 402 of dividing each constituent paragraph possibility, averaging the possibilities and then dividing by the total number of paragraphs in the webpage, as depicted by step 402 in FIG. 3. This yields a numerical ranking for the webpage. The content of the each ranked webpage is then presented contiguously to the user, in order of decreasing increasing average possibility for the returned webpage (e.g., for many types of pedagogical presentations). This step 404 is shown in FIG. 3.

Figure 4:
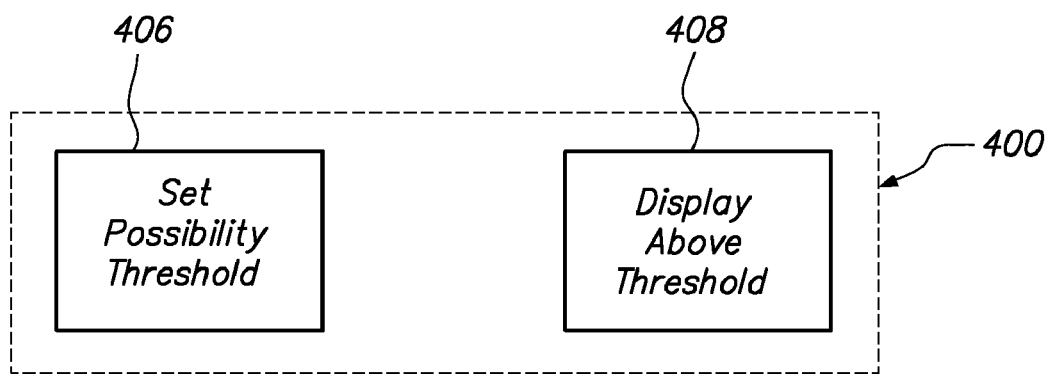
FIG. 4 is a block diagram that illustrates additional steps that can be performed after accomplishing the calculate possibilities step for the method shown in FIG. 1, according to several embodiments of the present invention.

If the system of several embodiments is in decision support mode, and as shown in FIG. 4, step 400 can include the step 406 setting a possibility threshold. If the user-settings page specifies a decision support presentation and the possibility for a paragraph from the normalized search results is below the user-set threshold, or negative by default, then the paragraph is removed from the crawled results. Only paragraphs that are above the predetermined possibility threshold are presented in decreasing order of their possibility to the user, without regard for the website from which they were taken (e.g., for many specific decision support tasks). This is shown by block 408 in FIG. 4.

When the system according to several embodiments is operating in decision support mode, the normalized websites above threshold can be iteratively processed to further constrain them prior to presentation to the user. Only normalized keywords (usually nouns) and not longer sequences are considered here because the user cannot afford the time to manually review the less important sequences. No special algorithm need be implemented to identify keywords; rather, they are identified by the relative infrequency of their occurrence. The above-described processes are repeated, word frequencies are computed over the remaining filtered websites just as was previously done for S+ and S− (e.g., counting a word at most once per occurrence per paragraph) as follows to arrive at a new H', which is an iterative, more refined hash table that original hash table H. The maximum number of such iterations can be set on the user-settings page. These keywords are presented to (and enunciated for) the user in order of non-decreasing frequency of occurrence up to some user-defined count and/or threshold frequency as determined on the user-settings page. Processing using S has previously delimited the user task, while using H' here provides additional focus for the user (e.g., in rating the utility of the returned material). The user then says, clicks, and/or touches, using checkboxes, whether the presented word is a positive instance, a negative instance, or neither/both (by default). For example, when dealing with laser physics, "boat" would be a negative training instance, since a laser is also a type of sailboat. The possibility for each paragraph is computed as before and is presented to the user in stable (i.e., preserving the previous ordering where possible) rank order in accordance with the presentation options found on the user settings page.

For the systems and methods according to several embodiments of the present invention, the user can cause a context-directed iterative search, as indicate by line 410 in FIG. 1. To do this, the user the displayed search results. For each paragraph, the user can rater the usefulness of the information in the paragraph by tagged with a radio button (which is set to a third-choice default of "DK", or don't know) to either "Useful" or "Not Useful" as shown by box 508 of screen shot 500 in FIG. 5, to provide simple, but valuable feedback to the system. When a user reads a paragraph produced in response to the query, the user can optionally rate it. Paragraphs that were rated by the user as "Useful" are taken in union in their presented sequence as are those that were rated as "Not Useful". Both groups are cached on the client—up to the S content limits, if any, found on the user-settings page.

Thus, if the user reads a returned paragraph and rates the paragraph as useful. The system and methods of the present invention add the words in the useful paragraph (designated by the letter "s") are added to the original sequence S+ to establish a new sequence (S+)' that is defined by ((S+)∪(s+)). (S+)' comprises the original terms from sequence S+ and terms s+ from the paragraph results which have been deemed as useful by the user. The user then has the option to search the database again at step 100 with new sequence (S+)'=((S+)∪ (s+)). Stated differently, the search can be context-directed by the user based on a review of the initial displayed search results (and also the displayed search results from subsequent iterations). This iterative, context-directed step is indicated by feedback line 410 in FIG. 1.

Similarly, when the user rates a paragraph (or a website when the system is in pedagogical mode) as Not Useful, the terms in that paragraph are assigned a value s− and added by the system and methods of several embodiments of the present invention to sequence S− to establish an updated sequence (S−)'=((S−)∪(s−)), of terms that the user does not want returned in the search results. This process may be iterated indefinitely, or until a fixed point is detected, for each new set of websites so found. In this manner, the system and methods according to several embodiments of the present invention keep the user in the loop in the display and application of previously stored and retrieved knowledge.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All systems and methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. A method for presenting Information from an internet database, said method comprising the steps of:
   A) searching said database using a query to yield search results;
   B) normalizing said search results by formatting said search results into a standard free text format, each of said search results having a number of paragraphs included therein, said query including a sequence S+ of words from said search results that the user wants displayed and a sequence S− of words from said search results that the user does not want to be displayed, so that S+∩S− is an empty set;
   C) crawling said normalized search results by generating a hash table H+ corresponding to said sequence S+ and a hash table H− corresponding to said sequence S−, determining an actual frequency count (AFC) for each entry in said hash table H+ and by calculating a possibility for each entry in said hash table H+ and said hash table H− according to the formula:

$$\text{possibility} = \sum_{H^+(seq) \in paragraph}^{|H^+|} (|\text{paragraphs}| - AFC)$$

if $|H^-|$ is zero (e.g., if $S-$ is left blank), $$\text{possibility} = - \sum_{H^-(seq) \in paragraph}^{|H^-|} (|\text{paragraphs}| - AFC)$$

if $|H^+|$ is zero (e.g., if $S+$ is left blank), otherwise, $$\text{possibility} = \sum_{H^+(seq) \in paragraph}^{|H^+|} (|\text{paragraphs}| - AFC) - \left(\frac{|H^+|}{|H^-|}\right)\left(\sum_{H^+(seq) \in paragraph}^{|H^-|} (|\text{paragraphs}| - AFC)\right)$$

Where
   |paragraphs| is the number of paragraphs in said normalized search results,
   AFC (actual frequency count) is the number of times each entry in said hash table H+ and said hash table H− appears in said search results,
   |H+| is the number in entries in said hash table H+,
   |H−| is the number in entries in said hash table H−, and
   D) selectively displaying said normalized search results corresponding to said possibilities from step C) according to a predetermined algorithm to yield said information.

2. The method of claim 1 wherein said search results are synonym normalized.

3. The method of claim 1 wherein said method is in pedagogical mode and said step D) is accomplished by:
   D1) averaging the possibilities calculated for each said paragraph from each respective said crawled search result by the total number of paragraphs in said crawled search result to yield an average possibility for each said crawled search result; and,
   D2) presenting said crawled search results to the user as said information, in order of decreasing average possibility.

4. The method of claim 1 wherein said method is in decision support mode and said step D is accomplished by:
   D1) setting a possibility threshold; and,
   D2) presenting said crawled search result paragraph having a possibility above said threshold as said information, in decreasing numeric order.

5. The method of claim 1, further comprising the steps of:
   E) rating each said displayed search result as useful or not useful; and,
   F1) establishing an updated sequence (S+)' defined as ((S+) ∪(s+)), where s+ are words in said displayed search result from said step E) that said user has rated as useful;
   F2) establishing an updated sequence (S−)' defined as ((S−) ∪(s−)), where s− are words in said displayed search result from said step E) that said user has rated as not useful; and,
   Accomplishing steps A) and C) using said updated sequence (S+)' and said updated sequence (S−)'.

6. A non-transitory computer readable storage medium storing instructions that, when executed by a computer, cause the computer to perform a method of extracting information form internet search results in response to a query by a user, said method comprising the steps of:
   A) normalizing said search results by formatting said search results into a standard free text format, each of said search results having a number of paragraphs included therein, said query including a sequence S+ of words from said search results that the user wants displayed and a sequence S− of words from said search results that the user does not want to be displayed, so that S+∩S− is an empty set;
   B) crawling said normalized search results to yield candidate information, said crawling step being accomplished by generating a hash table H+ corresponding to said sequence S+ and a hash table H− corresponding to said sequence S−, determining an actual frequency count (AFC) for each entry in said hash table H+ and said hash table H− and calculating a possibility for each entry in said hash table according to the formula $$\text{possibility} = \sum_{H^+(seq) \in paragraph}^{|H^+|} (|\text{paragraphs}| - AFC)$$

if $|H^-|$ is zero (e.g., if $S-$ is left blank), $$\text{possibility} = - \sum_{H^-(seq) \in paragraph}^{|H^-|} (|\text{paragraphs}| - AFC)$$

if $|H^+|$ is zero (e.g., if $S+$ is left blank), otherwise, $$\text{possibility} = \sum_{H^+(seq) \in paragraph}^{|H^+|} (|\text{paragraphs}| - AFC) - \left(\frac{|H^+|}{|H^-|}\right)\left(\sum_{H^+(seq) \in paragraph}^{|H^-|} (|\text{paragraphs}| - AFC)\right)$$

Where
   |paragraphs| is the number of paragraphs in said normalized search results,
   AFC (actual frequency count) is the number of times each entry in said hash table H+ and said hash table H− appears in said search results,

|H+| is the number in entries in said hash table H+,
|H−| is the number in entries in said hash table H−, and C) selectively displaying said candidate information according to a predetermined algorithm to yield said information.

7. The non-transitory computer readable storage medium of claim 6 wherein said method is in pedagogical mode and said step D is accomplished by:

D1) averaging the possibilities calculated for each said paragraph from each respective said crawled search result by the total number of paragraphs in said crawled search result to yield an average possibility for each said crawled search result; and, D2) presenting said crawled search results to the user as said information, in order of decreasing average possibility.

8. The non-transitory computer readable storage medium of claim 6 wherein said method is in pedagogical mode is in decision support mode and said step D is accomplished by:

D1) setting a possibility threshold; and,

D2) presenting said crawled search result paragraph having a possibility above said threshold as said information, in decreasing numeric order.

9. The non-transitory computer readable storage medium of claim 6 wherein said method, further comprises the steps of:

E) rating each said displayed search result as useful or not useful; and,

F1) establishing an updated sequence (S+)' defined as ((S+) ∪(s+)), where s+ are words in said displayed search result from said step E) that said user has rated as useful;

F2) establishing an updated sequence (S−)' defined as ((S−) ∪(s−)), where s− are words in said displayed search result from said step E) that said user has rated as not useful; and, Accomplishing steps A) and C) using said updated sequence (S+)' and said updated sequence (S−)'.

* * * * *